Nov. 3, 1936.  E. W. N. BOOSEY  2,059,844
GREASE INTERCEPTER
Filed Oct. 29, 1934  3 Sheets-Sheet 1

INVENTOR.
Edward W. N. Boosey.
BY
ATTORNEY.

Nov. 3, 1936.  E. W. N. BOOSEY  2,059,844
GREASE INTERCEPTER
Filed Oct. 29, 1934  3 Sheets-Sheet 2
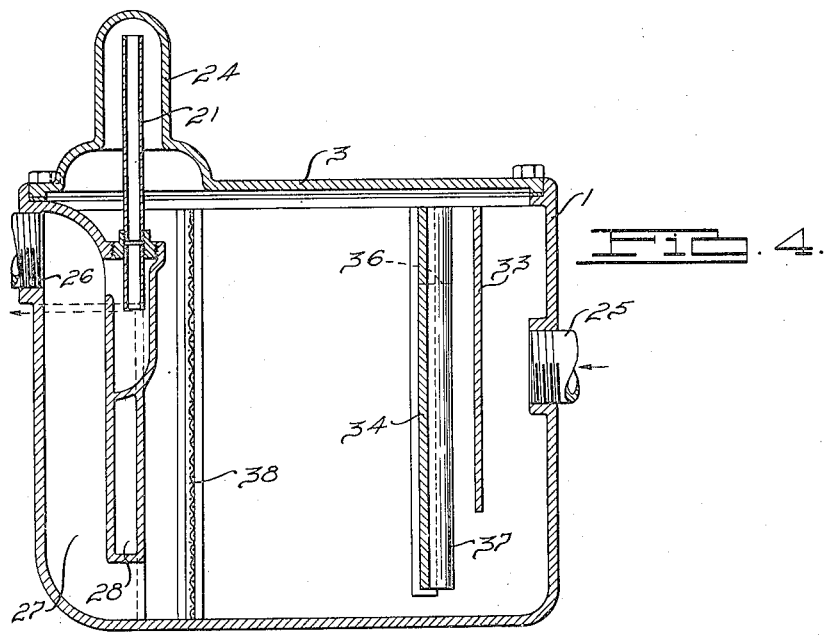
INVENTOR.
Edward W. N. Boosey,
BY
ATTORNEY.

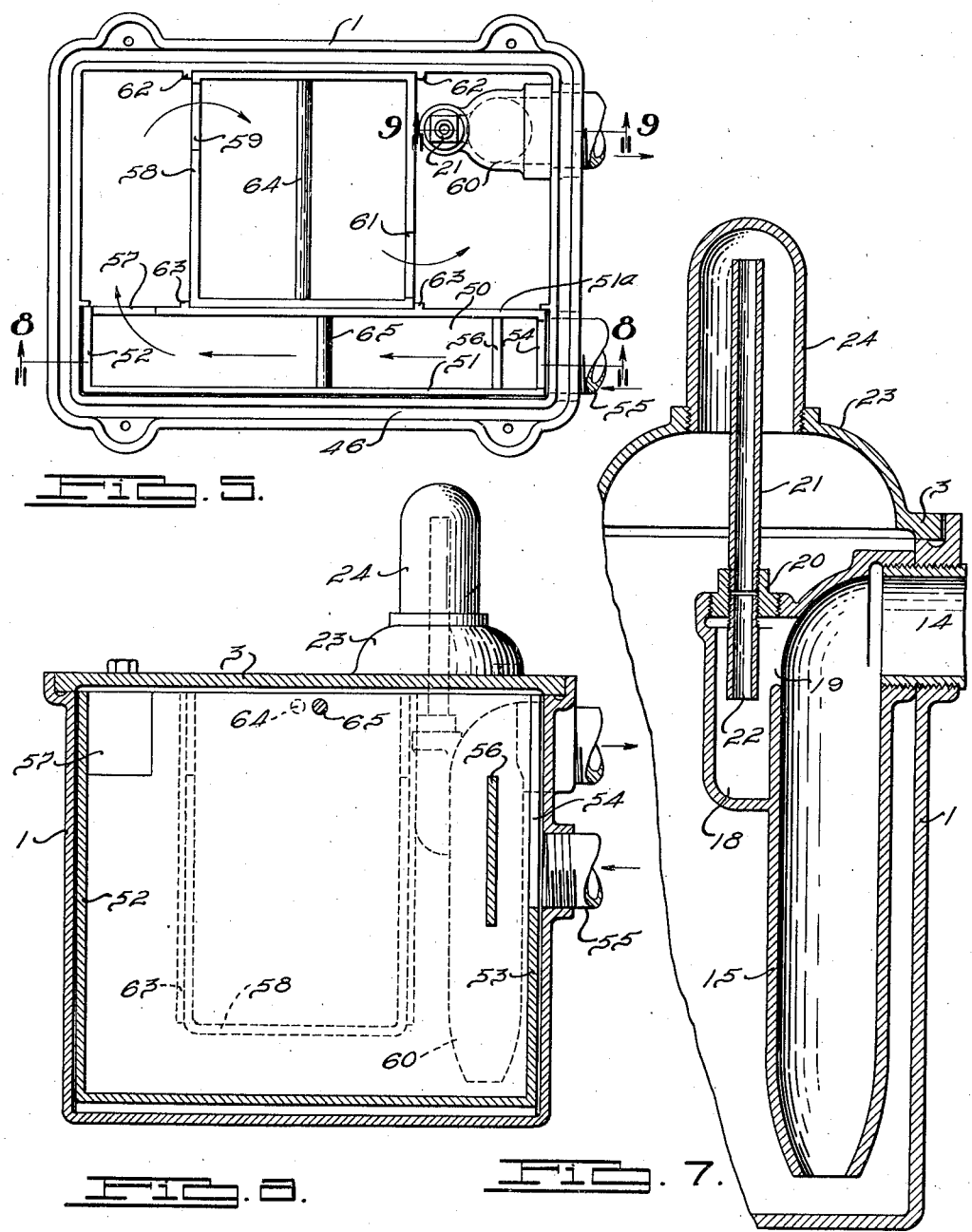

Patented Nov. 3, 1936

2,059,844

UNITED STATES PATENT OFFICE 2,059,844

GREASE INTERCEPTER

Edward W. N. Boosey, Detroit, Mich.

Application October 29, 1934, Serial No. 750,606

12 Claims. (Cl. 182—9)

This invention relates to grease intercepters for use in a waste line from plumbing fixtures of various characters to intercept grease discharged thereinto and prevent its discharge to a sewer with the remaining waste liquid.

The principal object of the invention is to provide a chambered member constructed or shaped to provide a passageway or compartment in which the grease and oils may rise and separate from the waste fluid prior to its entering the outlet.

Heretofore, in many structures, grease traps or intercepters are so constructed as to necessitate the flow of the waste liquid and the contained grease directly into the body of the trap and from which it may pass directly to the outlet. In my invention I have provided an outlet element which may be integral with the trap body or attachable thereto interiorly thereof and having an opening adjacent the bottom of the body of the trap; and in conjunction with the means for permitting the greases and oils to rise to the surface, means is also provided so that the remaining liquid practically free from grease may pass directly to the outlet.

It is also a feature and object of the invention to provide an outlet member of a character to prevent siphonage of the trap by providing for a flow of air from the top of the trap body to the outlet at each flushing thereof and so constructed as to prevent flow of gases from the sewer to the trap body.

The principal features of the invention are involved in the general means for causing or permitting a separation of greases and oils from waste liquid in the trap body immediately upon the grease containing liquid entering the trap and to prevent the greases from passing directly to the outlet and this feature of the invention may be attained by means of an apertured wall or by means of a basket as is more fully described in detail hereinafter.

These and other objects and various novel features of the invention are hereinafter more fully described and claimed, and the preferred form of construction of a grease intercepter embodying my invention is shown in the accompanying drawings in which—

Fig. 4 is a section taken on line 4—4 of Fig. 3.

Fig. 5 is also a plan view of still another form of the grease intercepter showing removable receptacles by means of which grease may be separated from the liquid body and non-liquid foreign matter may be accumulated.

Fig. 6 is a section taken on line 6—6 of Fig. 7.

Fig. 7 is an enlarged vertical section through the outlet element taken on line 9—9 of Fig. 7.

Figure 1:
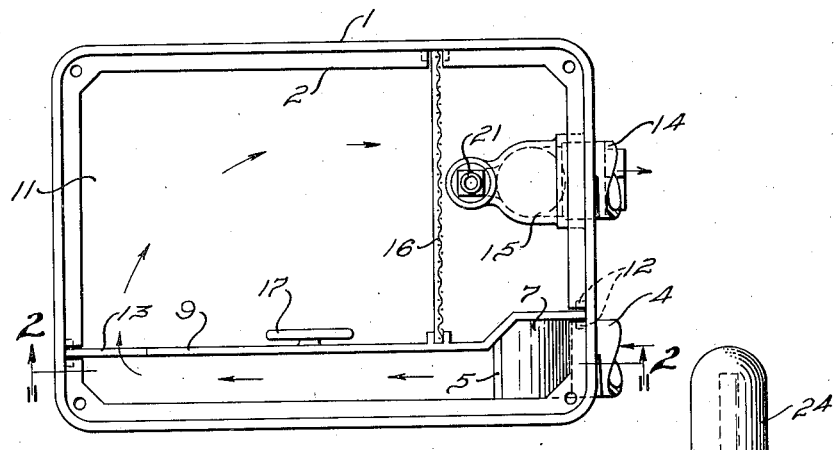
Fig. 1 is a plan view of my improved grease intercepter with the cover removed showing the grease intercepting channel on one side thereof.
Figure 2:
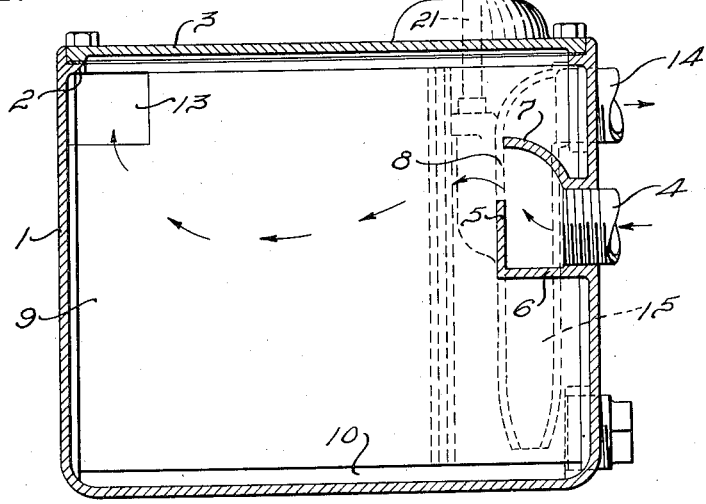
Fig. 2 is a section taken on line 2—2 of Fig. 1.

In disposal of most waste liquids as from floor drains, sinks etc., and especially in floors of garages and other places where considerable oil tends to be washed into a sewer, it is required usually by building codes of various cities that a means be provided for removing grease and oil from waste liquid prior to its passing to the sewer. This invention is directed particularly to that end and a simple form thereof is shown in Fig. 1 in plan view. This consists of a substantially rectangular body 1 flanged as at 2 to receive a cover 3 sealed thereto as shown in Fig. 2. In this form of the invention the inlet conduit is indicated at 4 which is threaded into an aperture provided in the end wall of the body and interiorly of the trap is provided a baffle 5 positioned at a distance from the discharge end of the inlet conduit 4 and is connected to the end wall of the intercepter preferably by an integral, horizontally disposed, member 6.

Above the wall and integral with the side wall of the intercepter is an upwardly curved baffle 7 spaced from the baffle 5 providing an opening 8 through which all the liquid passing through the conduit 4 must pass to enter the body. This baffle 5 tends, in a considerable manner, to cause upward and outward flow of the liquid, and greases and oils being lighter, will tend to rise to the top of the liquid body while the heavier liquid may flow to the bottom.

To further insure a time period for separation of the greases I provide a removable wall 9 extending across the body at one side and forming with the side wall thereof a channel practically the full depth of the interior of the body. This wall 9, however, does not extend to contact with the bottom of the trap, there being a space 10 underneath the wall 9. Thus the liquid passing downwardly from the opening 8 may pass beneath the partition wall 9 to the main part or outlet chamber 11 of the body. The wall 9 preferably extends approximately to the top of the intercepter body, the flange 2 being notched at opposite ends to receive the edges of this wall 9, and vertical ribs 12 are provided on the said end walls to receive the respective ends of the plate 9 to support the same from displacement. The arrows in both Figs. 1 and 2 indicate the general direction of flow of the grease and upper strata of the liquid which, to enter the main chamber 11, must pass between the outside wall of the body and the partition 9 and thence may pass through an aperture 13 in the partition 9 to the chamber 11.

The bottom edge of the aperture 13 is slightly below the liquid level of the trap as may be determined by the position of the discharge conduit 14. This conduit 14 is the ordinary threaded conduit and on the interior of the trap, as shown by dotted lines more particularly in Fig. 2, is a downwardly extending leg 15 spaced from the bottom and through which the liquid must pass to the discharge conduit 14. Thus the liquid is constantly removed from the bottom of the trap while the grease and oil that may be intercepted are continually maintained on the top of the liquid body. The discharge conduit portion 15 and means for preventing siphonage of the trap are hereinafter more fully described.

Preferably also there is provided a transverse screen member 16 extending from the removable partition 9 to the side wall of the intercepter body and shielding the outlet member 15. Thus practically all fluid that passes to the outlet must pass through the screen and foreign matter is there intercepted and prevented from clogging the outlet. When the trap has become more or less filled with grease and solid matter the cover, the screen and the wall 9 may be removed and the wall may be provided with a handle 17 for ease in removal but the grease may be removed prior to this screen and partition wall as desired and by such removal access to the entire bottom surface of the trap body is provided.

It is evident that siphonage of the trap should be prevented in order to prevent the withdrawal of the oils and greases which are floating on the surface of the liquid. For this purpose I provide the outlet leg 15 heretofore referred to which is shown in Fig. 7 with which the discharge conduit 14 is connected. This is simply a cast pipe having at its upper end the outturned portion threaded to receive the threaded end of the pipe 14 extending through the wall 1 of the body. Integral with this conduit portion 15 is provided a secondary trap 18 on the inner side thereof near the top and this trap is open to the interior of the conduit 15 at 19 near the top. The top of this secondary trap 18 is threaded to receive an externally threaded plug 20 which plug in turn is internally threaded to receive a small diameter pipe 21 at the top and a similar short length of the pipe 22 at the bottom which extends down into the trap body to below the lower edge of the opening 19. The lower edge of the opening 19 between the outlet leg 15 and the secondary trap 18 is below the lowermost point of the outlet conduit 14 to insure the filling or the maintenance of the secondary trap full of liquid to a point above the lower end of the tube 22. The tube 22 may be of any desired length short of the actual bottom wall of the secondary trap.

As the intercepter body fills with liquid at each flushing, the air or gas in the space above the liquid level is placed under pressure which tends to discharge through the secondary trap to the outlet but, as the liquid begins to flow through the waste outlet and thus decrease the liquid level, the secondary trap is maintained filled and the reduced pressure through the falling of the level of the liquid in the intercepeter body draws liquid up into the pipe 22 and possibly into the tube 21. The tendency to draw liquid from the intercepter body through the outlet leg 15 is thus counteracted and tends to maintain the liquid level in the body of the intercepter even above the level of the outlet conduit 14. Thus the normal liquid level in the body of the intercepter may be above the lowermost point of the outlet conduit 14. The pipes 21 and 22 and the trap 18 also provide a means for preventing an accumulation of pressure in the intercepter body, this being especially desirable where greases and decomposing matter productive of gases may be deposited in the intercepter and such pressure of gases when sufficiently great causes a discharge thereof to the outlet conduit 14. For the proper functioning of the siphonage preventing elements, I provide on the cover member a cup-shaped member 23 opening through the cover and formed with a threaded hub to receive a second cup member 24 into which the pipe 21 extends. Both these members are open to the interior of the trap body for a free flow of air and gases to the pipe 21 which terminates well above the level of the liquid in the intercepter body.

The operation of the waste outlet to prevent siphonage is as follows:

Normally there is a quantity of liquid in the intercepter practically level with the lower edge of the outlet which, in the construction shown, is near the top of the intercepter body. When additional liquid is discharged into the intercepter, the water level is raised to above the lower part of the outlet thus tending to produce an increased pressure above the liquid in the intercepter, but as soon as the inflow becomes reduced to below the volume of outflow and, due to the pipe 22 extending to below the water level in the secondary trap 18, there is a tendency to draw liquid up into this pipe 22. Finally as the inflow of fluid to the intercepter body ceases and while full flow continues through the discharge pipes 15 and 14 the suction on the liquid in the secondary trap 18 increases until the liquid is withdrawn from the pipe 22 and the air and gas space in the intercepter is opened to the outlet which, as soon as the air space is increased in the outlet through decrease in volume of flow of liquid, permits air to pass into the intercepter body through the pipes 22 and 21. There is therefore a period during the flushing of this trap when there is reduced pressure on the surface of the liquid in the intercepter body which is above the inlet. Therefore partial vacuum tends to be produced in the upper part of the intercepter body counteracting the tendency of flow through the outlet and then, as the liquid flow decreases, the air flow to the top of the intercepter body from the outlet equalizes the pressures on the liquid body and prevents siphonage.

Figure 3:
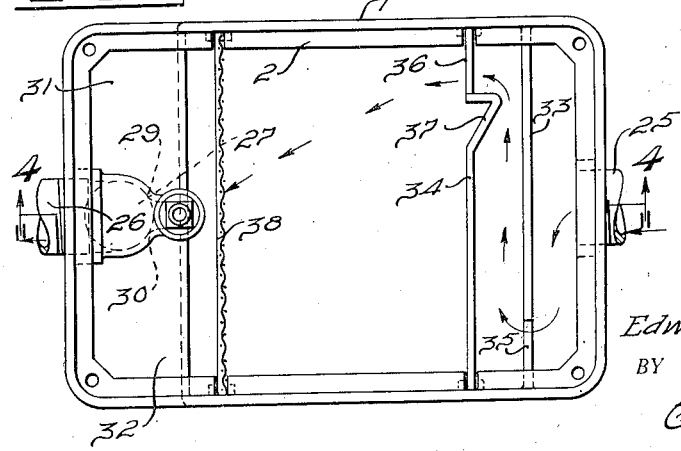
Fig. 3 is a plan view of an alternative form of a grease intercepter embodying my invention.

This same general result may be obtained by the construction shown in Figs. 3 and 4 in which the inlet 25 is at one end of the trap and the outlet 26 at the opposite end which outlet may be of the same form as that illustrated in Fig. 7 or may be formed integral therewith as shown more clearly in Fig. 4. If made integral as shown in Fig. 4, the outlet is preferably formed or provided in a recess 27 the side walls 29 and 30 of which are integral with the outlet member 26 and an opening 28 is provided extending to atmosphere through the oppositely disposed side walls 29 and 30 of the recess 27 thus to a material degree separating the outlet leg from the liquid chamber of the intercepter.

It is to be noted that the side walls 29 and 30 of the recess 27 terminate below the top of the body by a horizontal wall 31 and 32 respectively. This provides an area for liquid at the top of the trap greater than the cross sectional area of the trap body below the outlet and thus with this character of construction and with the outlet member within the confines of the trap body the area for accumulation of the grease is not decreased materially. This outlet member functions and is constructed similarly to the outlet member shown in Fig. 7 heretofore described and further description thereof is not given in respect to the outlet shown in Figs. 3 and 4. On the inlet side however are preferably placed two baffle members, the first member 33 being spaced from the bottom of the intercepter to a greater distance than the second baffle 34 which, as shown in plan view, extends across the intercepter body.

The first baffle member 33 has an opening 35 at one side of the intercepter to permit the greases rising from the inlet member to pass into the space between the baffles 33 and 34. The baffle 34 has an opening 36 at the opposite side of the intercepter body and at the top so that liquid passing through the opening 35 of the first baffle is required to pass across the intercepter and thence into the main body through the aperture 36. The baffle 34, as previously stated, extends to a distance below the baffle 33 as shown in Fig. 4 so that liquid passing into the intercepter from the inlet 25 and thence downwardly beneath the baffle 33 may lose some of its grease content by the same passing upward between the baffles 33 and 34. Preferably also the baffle 34 has a vertical step or rib 37 extending toward the baffle 33 forming a partial deflector for liquid flow at the top of the liquid body in the trap. This vertical step or rib 37 extends the full depth of the baffle plate 34 so that a slight swirling of the liquid flowing transversely between these bodies gives opportunity for the greases to rise to the surface. A vertical screen 38 is also provided adjacent the outlet end which tends to prevent foreign matter passing directly into the outlet.

Figs. 5 and 6 show a further form of the invention in which the inlet and outlet are on the same side of the intercepter body. In this case a basket 50 formed of two side walls 51 and 51a and end walls 52 and 53 is provided, the end wall 53 having an opening 54 therein through which the inlet conduit 55 discharges against a baffle plate 56 which is spaced a considerable distance from both the top and the bottom of the basket. The liquid flowing into the inlet 55 against the baffle 56 causes turbulence and provides opportunity for greases to rise to the surface of the liquid above the baffle and for the heavier liquids to pass therebelow but both the liquids and the greases must pass through the opening 57 in the inner wall 51a of the basket to the outlet chamber. This character of construction is desirable where the liquid contains considerable foreign matter as well as grease and the foreign matter will accumulate in the basket 50 while the greases and the cleared liquid flow into the second chamber. There is a second basket in the second chamber indicated at 58 which, as shown in dotted lines in Fig. 6, is spaced considerably from the bottom wall of the body and the liquids passing through the opening 57 may pass through an opening 59 into the basket and the heavier liquids may fall and pass beneath the basket 58 to the outlet member indicated at 60 which is of the same general character in function and construction as that shown in Fig. 7. From the opening 59 the liquid may flow across the basket 58 to the opposite side where it may pass through an opening 61 into the body of the intercepter and to the outlet 60. This basket 58 is removably supported in position by ribs 62 and 63.

A handhold 64 is provided to permit ready removal of this basket 58 and a similar handhold 65 is provided to permit removal of the basket 50. In this form a thorough removal of foreign matter is provided and a flow of grease to the outlet is prevented.

It is believed evident from the foregoing description that in all of the constructions described a partition wall of one form or another is provided and forming a space or a chamber into which the liquid first flows and in which the grease may rise to the surface and be distributed over the top of the liquid body in the intercepter and that these partitions all have the similar function of separating the interior of the body into a grease separating chamber and opportunity given for it to rise to the top of the liquid contained in the body.

It is further pointed out that, due to the particular form of the outlet member and its relationship to the parts of the structure including the removable partition walls or baskets, that only the liquid practically cleared of its grease content passes to the outlet and that the said outlet is of such construction as to prevent a siphonage of the trap and thus in each of the structures the grease is intercepted and the liquid freed thereof is passed to the outlet and in some of the constructions as for instance Figs. 5 and 6 the sediment is also separated from the liquid body prior to its passage to the outlet.

It is also evident from these several forms of construction that the invention practically is not in the exact construction of partition walls or baskets but in the relationship and arrangement thereof in association with baffles to insure the grease content being discharged from the inflowing liquid prior to its possible passage to the outlet and that various changes may be made in the structure of the outlet and arrangement of the partitions, etc.; without departing from the spirit and scope of the appended claims.

Having thus fully described my invention, its utility and mode of operation, what I claim and desire to secure by Letters Patent of the United States is—

1. A grease intercepter comprising a hollow body having an inlet below the top and an outlet arranged to determine the normal liquid level in the body, a partition extending across the body between the inlet and outlet separating the same into inlet and outlet chambers, said partition being arranged to provide for a flow of liquid from the surface of the inlet chamber to the surface of liquid in the outlet chamber and from the bottom of the said inlet to the bottom of said outlet chamber, a vent means providing for a flow of air and gas from the space above the liquid level in the hollow body to the outlet, and a secondary trap in the said vent means.

2. A grease intercepter comprising a hollow body having an inlet below the top and an outlet discharging from the body above the inlet and determining the normal liquid level in the body, a partition extending across the body between the inlet and outlet and separating the same into inlet and outlet chambers, the partition terminating above the bottom of the body to provide for a flow of liquid therebeneath from the inlet to the outlet chamber, said partition extending to above the normal liquid level and having an opening at the top providing for a flow of surface liquid from the inlet to the outlet chamber, a vent means providing for flow of air and gas from the space above the liquid level in the body to the outlet, and a secondary trap in the vent means discharging to the outlet.

3. A grease intercepter comprising a hollow body having an inlet below the top thereof and an outlet arranged to determine the normal liquid level in the body above the inlet and providing an air and gas space above the liquid body, a partition in the said body between the inlet and outlet separating the same into inlet and outlet chambers, the partition being arranged to provide for a flow of liquid from the bottom of the inlet chamber to the bottom of the outlet chamber and from the surface of the inlet chamber to the surface of the outlet chamber, and a vent means for the said space above the liquid body, comprising a trap one leg of which is open to the air space above the possible liquid level in the body and the other of which is open to the outlet below said normal liquid level.

4. A grease intercepter comprising a hollow body having an inlet and an outlet, said outlet being arranged to determine the normal liquid level in the body, a partition extending across the body between the inlet and outlet separating the same into inlet and outlet chambers, said outlet comprising an outlet leg opening to adjacent the bottom of the body and discharging to the said outlet, and a secondary trap having one leg opening to the said outlet leg at about the normal liquid level in the body and the other leg of the secondary trap being in communication with the hollow body above the liquid level, said other leg including an open ended tubular member extending into the body of the secondary trap with the open end below the outlet whereby said leg is sealed to the outlet until the liquid in the secondary trap falls below the said open end through influence of the outflowing liquid, thereby equalizing pressures on the liquid in the body and in the outlet leg.

5. In a grease trap, a hollow body having a chamber provided with an inlet and a chamber provided with an outlet, the inlet to the inlet chamber being below the normal liquid level and the outlet of the outlet chamber being positioned to determine the normal liquid level therein, said outlet including a vertical leg in the hollow body opening to the bottom thereof. the inlet chamber being arranged to cause the lighter liquids to rise to the surface and the heavier liquids to pass toward the bottom of the chamber, the wall between the chambers being arranged to provide for flow of liquid from the surface of the inlet chamber and from the bottom of the inlet chamber to the surface and bottom of the outlet chamber, a vent means opening to the space above the liquid level of the body at one end, and a secondary trap having a discharge opening to the vertical leg of the outlet and the opposite end of the said vent means opening thereinto below the liquid level in the trap, said trap and the discharge opening therefor being so positioned as to be replenished with liquid from the said vertical leg.

6. In a grease trap, a hollow body having a chamber provided with an inlet and a chamber provided with an outlet, the inlet to the inlet chamber being below the normal level and the outlet of the outlet chamber being positioned to determine the normal liquid level therein, said outlet including a vertical leg in the hollow body opening to the bottom thereof, the inlet chamber being arranged to cause the lighter liquids to rise to the surface and the heavier liquids to pass toward the bottom of the chamber, the wall between the chambers being arranged to provide for flow of liquid from the surface of the inlet chamber and from the bottom of the inlet chamber to the surface and bottom of the outlet chamber, a vent means opening to the space above the liquid level of the body at one end and at the other end to the outlet leg above the normal liquid level in the body, and a secondary trap in the said vent means containing liquid at about the normal liquid level in the body and the vent means having an extension opening to the secondary trap below the normal liquid level therein.

7. A grease intercepter comprising a hollow body having an inlet below the normal liquid level in the body and an outlet arranged to determine the normal liquid level, said outlet including a downwardly extending conduit terminating above the bottom of the body and with the said body forming a trap, a secondary trap having an opening to the outlet leg above the normal liquid level, an inlet opening to the space in the intercepter above the liquid level, and a tube extending from the inlet leg into the body of the secondary trap to below the normal liquid level therein.

8. A grease intercepter comprising a hollow body having an inlet below the top, an outlet discharging from the body above the inlet and determining the normal liquid level therein, a partition extending across the body between the inlet and the outlet and separating the said body into inlet and outlet chambers, the said partition terminating above the bottom of the body to provide for flow of liquid therebeneath from the inlet chamber to the outlet chamber and outlet and extending at the top to above the normal liquid level, said partition having an opening in the top providing for flow of surface liquid from the inlet chamber to the surface of the liquid in the outlet chamber, and a vent conduit having an inlet end above the top of the trap body in communication with the air space at the top of the trap body, and a secondary trap to which the vent means opens at the opposite end, said secondary trap discharging to the outlet at about the liquid level of the trap.

9. A grease intercepter comprising a hollow body having an inlet at one end and adjacent one side below the top, and means at the opposite side of the body discharging at a point above the inlet and thereby determining the normal liquid level in the body, a removable partition extending across the body to between the inlet and the outlet and separating the interior of the body into inlet and outlet chambers, the said partition terminating above the bottom of the body to provide for a flow of liquid therebeneath from the inlet chamber to the outlet chamber and outlet, a vertical baffle plate positioned in spaced relationship with the inlet whereby turbulence of the inflowing liquid is caused by its flowing against the baffle as it enters the body providing opportunity for the lighter liquid such as oils and greases to rise to the surface of the liquid in the body, said partition extending above the liquid level and having an opening therein at a distance from the inlet through which the lighter liquids may flow from the surface of the inlet chamber to the surface of the liquid in the outlet chamber at each flushing of the intercepter.

10. A grease intercepter comprising a hollow body having an inlet below the top and an outlet discharging from the body above the inlet and determining the normal liquid level therein, a basket like element having side, end and bottom walls to which the inlet opens at one end, said side and end walls extending to above the normal liquid level and being positioned at one side of the said hollow body and providing an inlet chamber, the inner wall of said basket having an opening at the top at the end opposite the inlet end through which the upper surface of the liquid in the chamber may flow, a baffle in the said basket adjacent the inlet, the upper edge of which is at about the normal liquid level and the lower edge of which is spaced from the bottom of the basket, said baffle providing a means to deflect a portion of the liquid containing the greases and oils upwardly and the heavier liquids downwardly beneath the baffle.

11. A grease intercepter comprising a hollow body having an inlet below the top at one end, an outlet at the opposite end discharging from the body above the inlet and determining the normal liquid level therein, baffle means between the inlet and outlet extending transversely of the body and providing a chamber in which the lighter oils and greases may rise to the surface and pass to the surface of the liquid on the outlet side of the baffles, the said outlet including a vertical leg opening adjacent the bottom of the body, the wall on the said body at the outlet end having a recess, the side walls of which are integral with the outlet, the top of the body extending over the recess and the walls forming the recess terminating below the top of the body at about the normal liquid level, a horizontal wall extending over the said walls providing the recess and providing angular recesses on each side of the said side walls on the exterior of the body, said outlet leg being separated from the interior of the body by a wall integral with the side walls of the recess and spaced from the outlet, the said space being open to atmosphere through the said walls of the recess, and a vent means opening to the interior of the body above the possible liquid level therein and to the outlet above the normal liquid level in the body.

12. A grease intercepter comprising a hollow body having an inlet below the top and an outlet discharging therefrom above the inlet, said outlet including a tubular portion extending to near the bottom of the body, a partition extending across the body between the inlet and outlet and providing inlet and outlet chambers, the inlet chamber providing a means permitting an accumulation of oils and greases on the surface and the heavier liquids to fall therebelow, the partition being arranged to permit flow from the bottom of the inlet chamber to the bottom of the outlet chamber, a vent means including a tubular element opening to the air space above the liquid level in the said body, and a secondary trap in communication with the outlet and filling with liquid from the outlet, said tubular element opening to below the liquid surface in the secondary trap and providing a means for counteracting the tendency of the liquid body to discharge through the said tubular portion of the outlet and tending to maintain the liquid level in the hollow body above the point determined by the position of the outlet.

EDWARD W. N. BOOSEY.